US012332094B2

(12) United States Patent
Jaaskelainen et al.

(10) Patent No.: US 12,332,094 B2
(45) Date of Patent: Jun. 17, 2025

(54) MACHINE LEARNING-BASED WELLBORE FLUID FLOW RATE PREDICTION

(71) Applicant: Halliburton Energy Services, Inc., Houston, TX (US)

(72) Inventors: Mikko Jaaskelainen, Houston, TX (US); Benjamin Simon Schaeffer, Denver, CO (US); Julian Edmund Drew, Aurora, CO (US)

(73) Assignee: Halliburton Energy Services, Inc., Houston, TX (US)

( * ) Notice: Subject to any disclaimer, the term of this patent is extended or adjusted under 35 U.S.C. 154(b) by 462 days.

(21) Appl. No.: 17/955,170

(22) Filed: Sep. 28, 2022

(65) Prior Publication Data

US 2024/0102835 A1    Mar. 28, 2024

(51) Int. Cl.
*G01F 1/32* (2022.01)
*E21B 47/10* (2012.01)
*G01F 1/661* (2022.01)
*G01V 8/16* (2006.01)

(52) U.S. Cl.
CPC ............ *G01F 1/3227* (2013.01); *E21B 47/10* (2013.01); *G01F 1/661* (2013.01); *G01V 8/16* (2013.01); *E21B 2200/22* (2020.05)

(58) Field of Classification Search
None
See application file for complete search history.

(56) References Cited

U.S. PATENT DOCUMENTS 6,216,544 B1   4/2001  Adachi et al.
8,204,693 B2   6/2012  Briers et al.
2015/0377667 A1  12/2015  Ahmad et al.
2017/0275986 A1   9/2017  Nunes et al.
2018/0003032 A1   1/2018  Donzier et al.
2018/0073904 A1   3/2018  Parolini et al.
2018/0202264 A1   7/2018  Sarduy et al.
2018/0356275 A1  12/2018  Zhao et al.
2019/0219716 A1   7/2019  O'Toole et al.
2019/0242735 A1   8/2019  Garoon et al.

(Continued)

FOREIGN PATENT DOCUMENTS

CN    113341459    9/2021
CN    114371504    4/2022

(Continued)

OTHER PUBLICATIONS

Becker, et al., "Distributed Acoustic Sensing as a Distributed Hydraulic Sensor in Fractured Bedrock", Water Sources Ressearch, vol. 56, Issue 9, Aug. 14, 2020, 10 pages.

(Continued)

*Primary Examiner* — Jermele M Hollington
*Assistant Examiner* — Carl F. R. Tchatchouang
(74) *Attorney, Agent, or Firm* — DeLizio, Peacock, Lewin & Guerra LLP

(57) ABSTRACT

A method for configuring a learning machine to predict a flow rate of at least one phase of a fluid. The method comprises determining a feature set for the learning machine, the feature set including information derived from a signal generated by a flow of the fluid interacting with a fluidic oscillator in a wellbore. The method comprises configuring the learning machine with the feature set including information derived from the signal.

20 Claims, 9 Drawing Sheets

(56) References Cited

U.S. PATENT DOCUMENTS

| | | | |
|---|---|---|---|
| 2019/0324166 | A1 | 10/2019 | Lolla et al. |
| 2019/0338621 | A1 | 11/2019 | Jin et al. |
| 2020/0025963 | A1 | 1/2020 | Ghahfarokhi et al. |
| 2020/0278465 | A1 | 9/2020 | Salman et al. |
| 2020/0309981 | A1 | 10/2020 | Ang et al. |
| 2021/0010839 | A1 | 1/2021 | Garoon et al. |
| 2021/0018655 | A1* | 1/2021 | Sun .................. E21B 43/00 |
| 2021/0025740 | A1 | 1/2021 | Quin et al. |
| 2021/0047916 | A1* | 2/2021 | Thiruvenkatanathan .................. E21B 47/135 |
| 2021/0088476 | A1 | 3/2021 | Abdelfattah et al. |
| 2021/0089905 | A1 | 3/2021 | Olsen et al. |
| 2021/0123334 | A1 | 4/2021 | Madasu et al. |
| 2021/0318457 | A1 | 10/2021 | Zheng et al. |
| 2021/0381865 | A1* | 12/2021 | Ellison .................. E21B 47/001 |
| 2021/0382194 | A1 | 12/2021 | Mukhtarov et al. |
| 2021/0389486 | A1 | 12/2021 | Thiruvenkatanathan |
| 2022/0034220 | A1 | 2/2022 | Madasu et al. |
| 2022/0065085 | A1 | 3/2022 | Shetty et al. |
| 2023/0417136 | A1 | 12/2023 | Gibson, Jr. |
| 2024/0027640 | A1 | 1/2024 | Schaeffer |
| 2024/0118118 | A1 | 4/2024 | Drew et al. |

FOREIGN PATENT DOCUMENTS

| | | |
|---|---|---|
| EP | 1250513 | 4/2005 |
| EP | 3800323 | 4/2021 |
| GB | 2570260 | 4/2022 |
| WO | 2021133864 | 7/2021 |
| WO | 2023249663 | 12/2023 |
| WO | 2024019761 | 1/2024 |
| WO | 2024072454 | 4/2024 |
| WO | 2024076374 | 4/2024 |

OTHER PUBLICATIONS

Carpenter, "Distributed Fiber-Optic Sensing Enhances Flow Diagnostics in Gas Condensate Well", Journal of Petroleum Technology, vol. 74, Issue 3, Mar. 1, 2022, 3 pages.

Dande, et al., "Fluid Flow Rate and Perforation Cluster Efficiency Using Fiber-Optics Das Data", 55th U.S. Rock Mechanics/Geomechanics Symposium Jun. 18-25, 2021, Jun. 18, 2021, 6 pages.

Drew, et al., "Oil and Gas Well Multi-Phase Fluid Flow Monitoring With Multiple Transducers and Machine Learning", Pending U.S. Appl. No. 63/263,898, filed Nov. 11, 2021, 17 pages.

Ekechukwu, et al., "Well-Scale Demonstration of Distributed Pressure Sensing Using Fiber-Optic DAS and DTS", Scientific Reports vol. 11, Article No. 12505 (2021), Jun. 14, 2021, 18 pages.

Garcia-Ceballos, "Machine Learning Based Two-Phase Flow Monitoring Using DAS", Colorado School of Mines; 2021 Virtual Undergraduate Research Symposium; https://www.mines.edu/undergraduate-research/machine-learning-based-two-phase-flow-monitoring-using-das/, Apr. 19-23, 2021, 6 pages.

Sharma, et al., "Well-Scale Multiphase Flow Characterization and Validation Using Distributed Fiber-Optic Sensors for Gas Kick Monitoring", Optics Express vol. 28, Issue 26, Dec. 21, 2020, 15 pages.

"PCT Application No. PCT/US2022/073172, International Search Report and Written Opinion", Mar. 23, 2023, 9 pages.

"PCT Application No. PCT/US2022/074086, International Search Report and Written Opinion", Apr. 13, 2023, 10 pages.

Anikiev, et al., "Microseismic event location using artificial neural networks", First International Meeting for Applied Geoscience & Energy Expanded Abstracts, Sep. 1, 2021, 5 pages.

Castellanos, et al., "Microseismic Event Locations using the Double-Difference Algorithm", Recorder: Official Publication of the Canadian Society of Exploration Geophysicists, vol. 38 Issue No. 03, Mar. 1, 2013, 12 pages.

"Distributed acoustic sensing", Wikipedia, The Free Encyclopedia. Wikipedia, The Free Encyclopedia, Jul. 5, 2022.) (Year: 2022), Jul. 5, 2022, 4 pages.

"U.S. Appl. No. 17/871,545 Non-Final Office Action", Oct. 15, 2024, 26 pages.

"U.S. Appl. No. 17/961,291 Non Final Office Action", filed Aug. 16, 2024, 17 pages.

Huot, et al., "Detection and Characterization of Microseismic Events from Fiber-Optic DAS Data Using Deep Learning", Sensors (Basel). Oct. 5, 2021;21(19):6627. doi: 10.3390/s21196627. PMID: 34640947; PMCID: PMC8512364.) (Year: 2021), Mar. 14, 2022, 27 pages.

Wamriew, et al., "Deep Neural Networks for Detection and Location of Microseismic Events and Velocity Model Inversion from Microseismic Data Acquired by Distributed Acoustic Sensing Array", Sensors (Basel). Oct. 5, 2021;21(19):6627. doi: 10.3390/s21196627. PMID: 34640947; PMCID: PMC8512364.) (Year: 2021), Oct. 5, 2021, 17 pages.

"PCT Application No. PCT/US2022/077293, International Search Report and Written Opinion", Jun. 27, 2023, 17 pages.

"PCT Application No. PCT/US2022/077805, International Search Report and Written Opinion", Jul. 3, 2023, 9 pages.

"PCT/US2022/073172 International Preliminary Report on Patentability", Jan. 2, 2025, 6 pages.

"U.S. Appl. No. 17/849,301 Non-Final Office Action", filed Jan. 15, 2025, 28 pages.

"U.S. Appl. No. 17/961,291 Final Office Action", filed Dec. 4, 2024, 16 pages.

\* cited by examiner

MACHINE LEARNING-BASED WELLBORE FLUID FLOW RATE PREDICTION

TECHNICAL FIELD

The disclosure relates generally to the field of wellbore operations and more particularly to the field of machine learning-based wellbore fluid flow rate prediction.

BACKGROUND

In hydrocarbon recovery operations from a wellbore, monitoring flow rates of the types of fluids produced within the wellbore may be important to maximize hydrocarbon recovery. For example, determination of flow rates of different phases of a fluid at different depths of the wellbore may be used in maximizing of hydrocarbon recovery from the surrounding subsurface formation.

BRIEF DESCRIPTION OF THE DRAWINGS

The present invention is illustrated by way of example and not limitation in the Figures of the accompanying drawings in which.

DESCRIPTION OF EMBODIMENTS

Example embodiments relate to using machine-learning to predict the phase flow rates of a fluid in a wellbore. A given fluid flowing through a wellbore may be comprised of multiple phases such as oil, water, and gas. Signals, generated by fluid flowing through a fluidic oscillator, may be indicative of the instantaneous phase types and phase rates flowing through the wellbore. The fluid phases may vary at different depth intervals in the wellbore and may change over time. The signals, generated by the fluid flow through a fluidic oscillator, may be processed to predict a flow rate of each phase of the fluid. For example, an acoustic signal generated by the fluid flow through a fluidic oscillator may be detected by fiber optic sensing using an optical fiber positioned in the wellbore. Signal processing and interpretation of these detected signals to predict flow rates may be complex. As further described below, example embodiments may include machine learning to assist in this signal processing and interpretation.

In particular, example embodiments may address the challenges with regard to prediction of phase flow rates in a wellbore from acoustic measurements. One or more flow meters may be positioned at different measured depths of a wellbore. Each such flow meter may include one or more fluidic oscillators. As fluid flows through the flow metering device, each of the fluidic oscillators may generate acoustic signals that may be measured by systems such as a distributed acoustic sensing (DAS) system. The acoustic signals may be processed to determine the time domain signal. Additionally, the time domain signal may be further processed such that the data may be input into a machine learning model that is trained to predict the phase flow rates. In some instances, the power spectral density of the frequency domain may be determined and input into the machine learning model to predict the phase flow rates.

In some embodiments, the machine learning model (e.g., a neural network) may be comprised of multiple feed forward branches such as a branch for the power spectral density and a branch for properties such as fluid properties and fluidic oscillator properties. Additionally, the features from each of the feed forward branches may be concatenated. Thus, in some embodiments, the concatenation of power spectral density features, fluid properties, and flow metering device may be used by a machine learning model to predict the phase flow rate. The predicted phase flow rates may be used to perform downhole operations in the wellbore. For instance, operations to isolate a depth interval may performed based on the predicted phase flow rates indicating a lack of hydrocarbon flow from said depth interval. In another instance, a reservoir model of the subsurface formation may be updated based on the predicted phase flow rates.

Example Components

Figure 1:
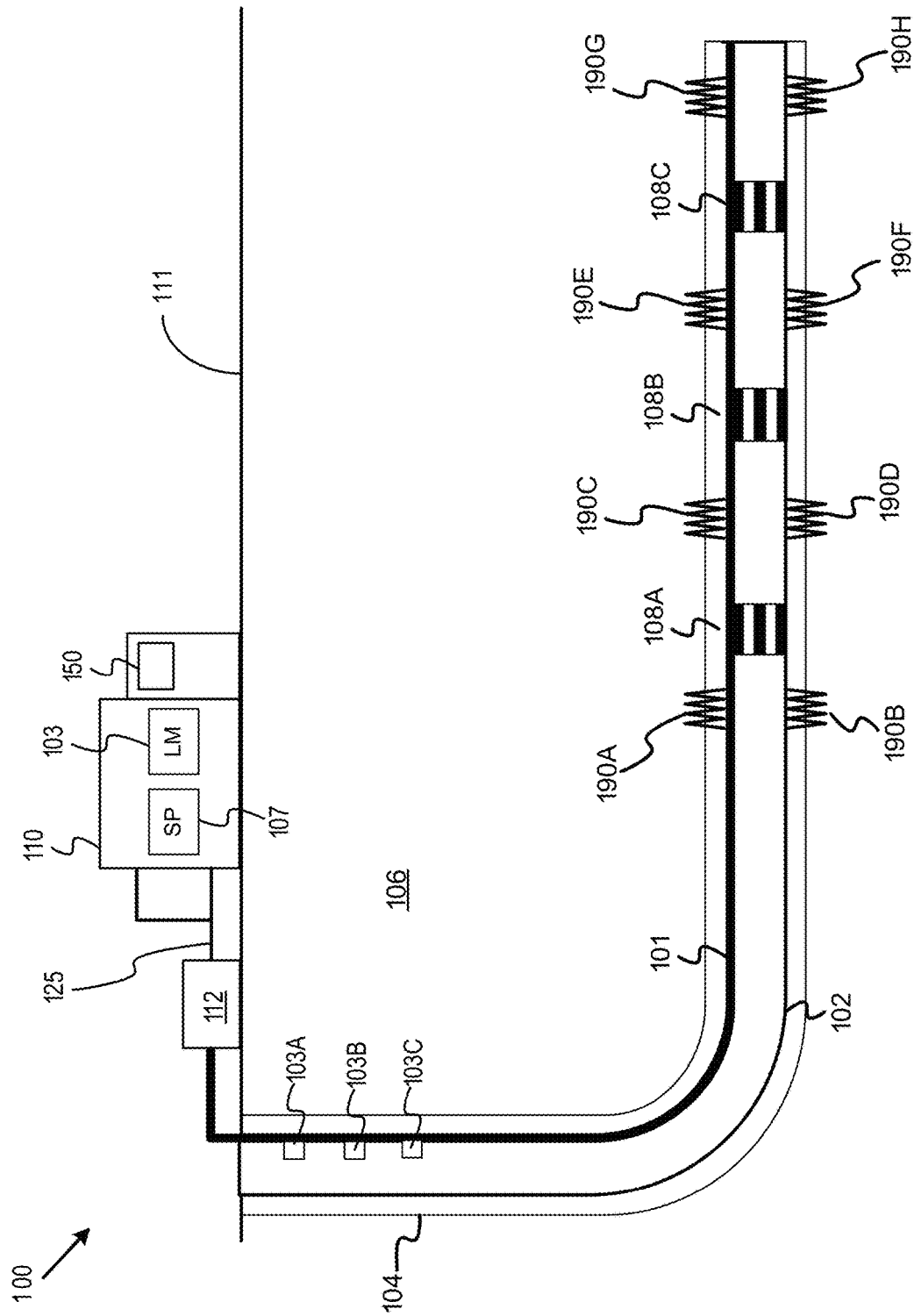
FIG. 1 depicts an example well system configured for machine learning-based prediction of phases of flow rates of fluid in a wellbore, according to some embodiments.

FIG. 1 depicts an example well system configured for machine learning-based prediction of phases of flow rates of fluid in a wellbore, according to some embodiments. A well system 100 may comprise a wellbore 104 in a subsurface formation 106. The wellbore 104 may include a casing 102 and a number of perforations 190A-190G being made in the casing 102 at different depths as part of hydraulic fracturing to allow hydraulic communication between the subsurface formation 106 and the casing 102. The well system 100 also may include a fiber optic cable 101. The fiber optic cable 101 may be cemented in place in the annular space between the casing 102 of the wellbore 104 and the subsurface formation 106. In some implementations, the fiber optic cable 101 may be clamped to the outside of the casing 102 during deployment and protected by centralizers and cross coupling clamps. The fiber optic cable 101 may house one or more optical fibers, and the optical fibers may be single mode fibers, multi-mode fibers, or a combination of single mode and multi-mode optical fibers. While FIG. 1 depicts using machine learning prediction of flow rates for a hydraulic fracturing application, example embodiments may be used any other stage of hydrocarbon recovery from a wellbore and/or monitoring of flow rates in a wellbore.

The fiber optic cable 101 may be used for distributed sensing where acoustic, strain, and temperature data may be collected. The data may be collected at various positions distributed along the fiber optic cable 101. For example, data may be collected every 1-3 ft along the full length of the fiber optic cable 101. The fiber optic cable 101 may be included with coiled tubing, wireline, loose fiber using coiled tubing, or gravity deployed fiber coils that unwind the fiber as the coils are moved in the wellbore 104. The fiber optic cable 101 also may be deployed with pumped down coils and/or self-propelled containers. Additional deployment options for the fiber optic cable 101 may include coil tubing and wireline deployed coils where the fiber optic cable 101 is anchored at the toe of the wellbore 104. In such embodiments, the fiber optic cable 101 may be deployed when the wireline or coiled tubing is removed from the wellbore 104. The distribution of sensors shown in FIG. 1 is for example purposes only. Any suitable sensor deployment may be used. For example, the well system 100 may include fiber optic cable deployed sensors or sensors cemented into the casing. Different types of sensors deployments also may be combined in a single well, such as including both sensors cemented to the casing and sensors in plugs, flow metering devices, etc. in a single well system.

A fiber optic interrogation unit 112 may be located on the surface 111 of the well system 100. The fiber optic interrogation unit 112 may be directly coupled to the fiber optic cable 101. Alternatively, the fiber optic interrogation unit 112 may be coupled to a fiber stretcher module, wherein the fiber stretcher module is coupled to the fiber optic cable 101. The fiber optic interrogation unit 112 may receive measurement values taken and/or transmitted along the length of the fiber optic cable 101 such as acoustic, temperature, strain, etc. The fiber optic interrogation unit 112 may be electrically connected to a digitizer to convert optically transmitted measurements into digitized measurements. The well system 100 may contain multiple sensors, such as sensors 103A-C. There may be any suitable number of sensors placed at any suitable location in the wellbore 104. The sensors 103A-C may include pressure sensors, distributed fiber optic sensors, point temperature sensors, point acoustic sensors, interferometric sensors or point strain sensors. Distributed fiber optic sensors may be capable of measuring distributed acoustic data, distributed temperature data, and distributed strain data. Any of the sensors 103A-C may be communicatively coupled (not shown) to other components of the well system 100 (e.g., the computer 110). The sensors 103A-C may be cemented to a casing 102.

Figure 9:
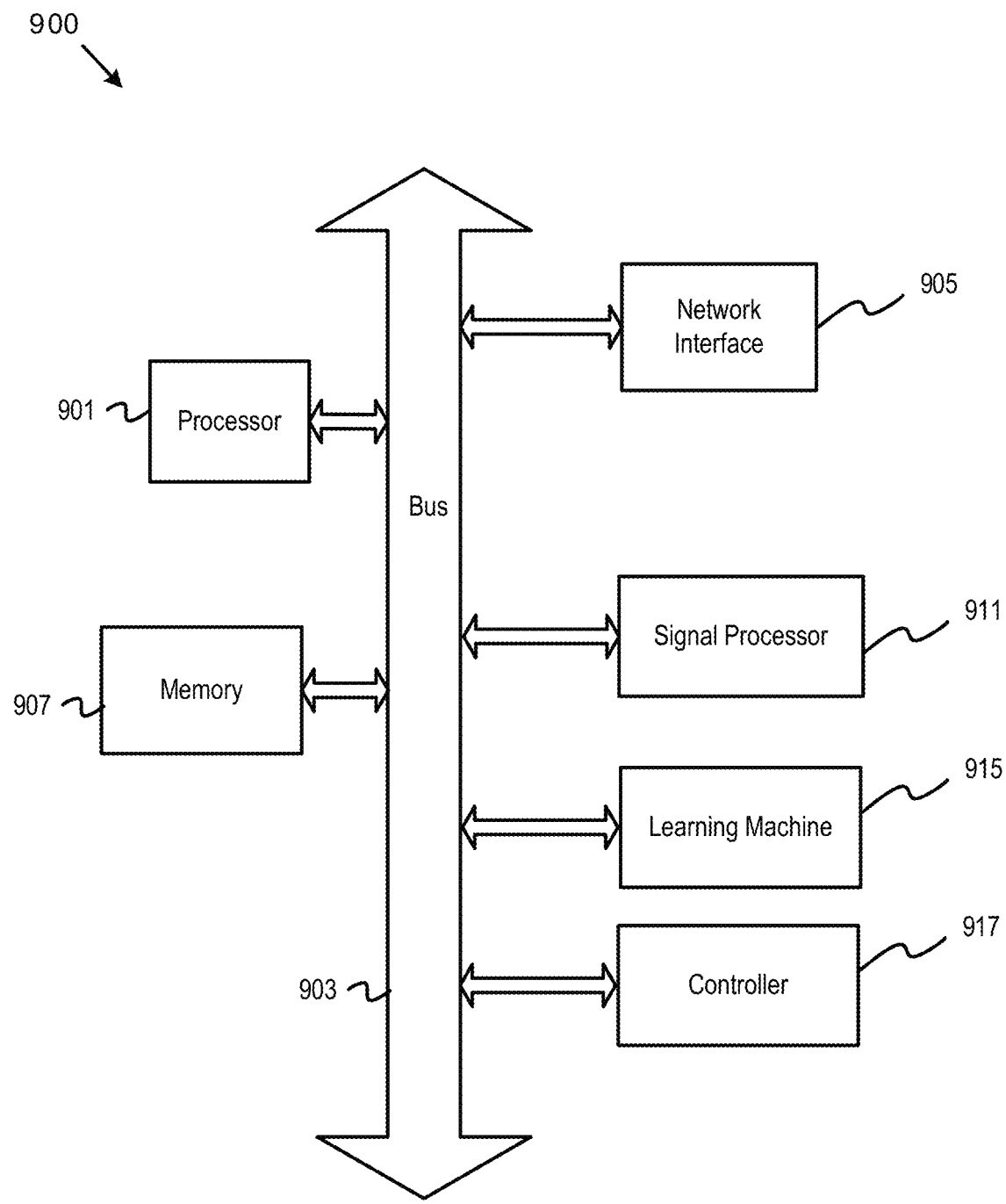
FIG. 9 depicts an example computer, according to some embodiments.

A computer 110 may receive the electrically transmitted measurements from the fiber optic interrogation unit 112 using a connector 125. The computer 110 may include a signal processor 107 to perform various signal processing operations on signals captured by the fiber optic interrogation unit 112 and/or other components of the well system 100. The computer 110 may have one or more processors and a memory device to analyze the measurements and graphically represent analysis results on the display device 150. The computer 110 also may include a learning machine 103. The learning machine 103 may include any suitable neural network, such as a convolutional neural network. The learning machine 103 may implement any suitable machine learning model to determine phase flow rates as described herein. The learning machine 103 may include machine-readable instructions that, when executed by a processor, cause the processor to perform operation for configuring a feature set, training itself based on training data, and determining phase flow rates as described herein. An example of the computer 110 is depicted in FIG. 9, which is further described below.

The fiber optic interrogation unit 112 may operate using various sensing principles including but not limited to amplitude-based sensing systems like Distributed Temperature Sensing (DTS), DAS, Distributed Vibration Sensing (DVS), and Distributed Strain Sensing (DSS). For example, the DTS system may be based on Raman and/or Brillouin scattering. A DAS system may be a phase sensing-based system based on interferometric sensing using homodyne or heterodyne techniques where the system may sense phase or intensity changes due to constructive or destructive interference. The DAS system may also be based on Rayleigh scattering and in particular coherent Rayleigh scattering. A DSS system may be a strain sensing system using dynamic strain measurements based on interferometric sensors (e.g., sensors 103A-C) or static strain sensing measurements using Brillouin scattering. DAS systems based on Rayleigh scattering may also be used to detect dynamic strain events. Temperature effects may in some cases be subtracted from both static and/or dynamic strain events, and temperature profiles may be measured using Raman based systems and/or Brillouin based systems capable of differentiating between strain and temperature, and/or any other optical and/or electronic temperature sensors, and/or any other optical and/or electronic temperature sensors, and/or estimated thermal events.

In some implementations, the fiber optic interrogation unit 112 may measure changes in optical fiber properties between two points in the optical fiber at any given point, and these two measurement points move along the optical sensing fiber as light travels along the optical fiber. Changes in optical properties may be induced by strain, vibration, acoustic signals and/or temperature as a result of the fluid flow. Phase and intensity based interferometric sensing systems may be sensitive to temperature and mechanical, as well as acoustically induced, vibrations. The fiber optic interrogation unit 112 may capture DAS data in the time domain. One or more components of the well system 100 may convert the DAS data from the time domain to frequency domain data using Fast Fourier Transforms (FFT) and other transforms. For example, wavelet transforms may also be used to generate different representations of the DAS data. Various frequency ranges may be used for different purposes and where low frequency signal changes may be attributed to formation strain changes or fluid movement and other frequency ranges may be indicative of fluid or gas movement. Various filtering techniques may be applied to generate indicators of events related to measure the flow of fluid.

In some implementations, DAS measurements along the wellbore 104 may be used as an indication of fluid flow through the casing 102 in the wellbore 104. Vibrations and/or acoustic profiles may be recorded and stacked over time, where a simple approach could correlate total energy or recorded signal strength with known flow rates. For example, the fiber optic interrogation unit 112 may measure energy and/or amplitude in multiple frequency bands where changes in select frequency bands may be associated with oil, water and/or gas thus enabling multiphase production profiling along the wellbore 104.

Flow metering devices 108A-C may be positioned in the wellbore 104 at different depths. As further described below, flow metering devices 108A-C may include at least one fluidic oscillator. The fiber optic cable 101 may detect the signals (i.e., vibrations and/or acoustic signals) generated by the fluid as the fluid flows through the fluidic oscillators of the flow metering devices 108A-C. In some embodiments, the flow metering devices 108A-C may be placed in an approximately horizontal section of the wellbore so different phases of the fluid flow through different fluidic oscillators within the flow metering devices 108A-C. In some embodiments, the flow metering devices 108A-C may be positioned on surface 111. Sensors, such as the fiber optic cable 101 and electrical sensors may also be placed on surface to detect the signals generated by the flow metering devices 108A-C. Electrical sensors may be point devices co-located with the flow metering devices 108A-C. Thus, in addition to acoustic signals, the sensors may measure pressure, differential pressure, vibration, temperature, etc. as the fluid flows through the flow metering devices 108A-C on surface.

Figure 2:
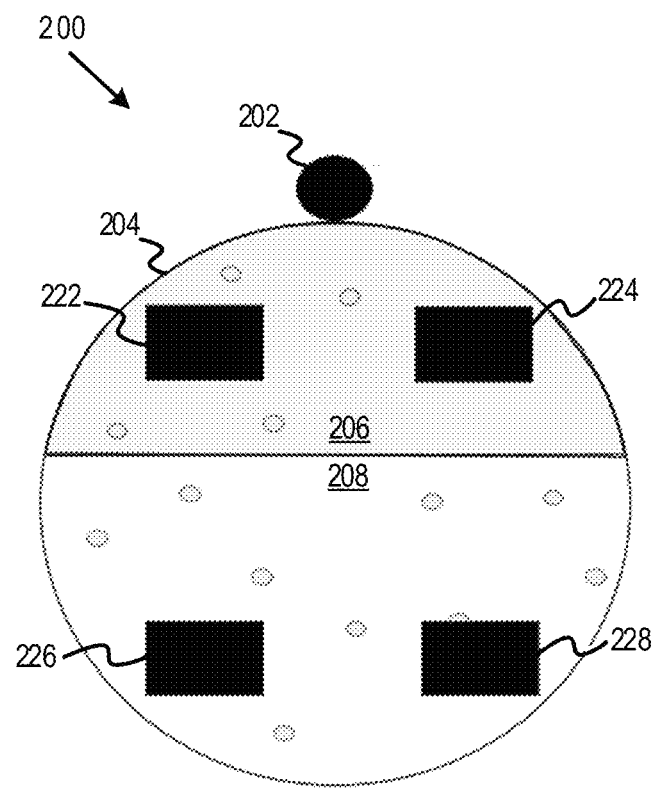
FIG. 2 depicts a cross-section of an example flow metering device having multiple fluidic oscillators, according to some embodiments.

FIG. 2 depicts a cross-section of an example flow metering device having multiple fluidic oscillators, according to some embodiments. FIG. 2 includes a flow metering device 200 comprising a pipe 204 and fluidic oscillators 222-228. The flow metering device 200 may be integrated into the casing of an approximately horizontal section of a wellbore such as the casing 102 in FIG. 1. At least one fluidic oscillator, such as fluidic oscillators 222-228 may be placed inside the pipe 204. In some embodiments, the fluidic oscillators 222-228 may include symmetrical or asymmetrical fluidic oscillator channels. The fluidic oscillators 222-228 may be oriented at varying angles relative to the direction of flow to generate variations in the flow rate as fluid comprising phases. In the example of FIG. 2, the phases of the fluid may include oil 206 and water 208.

In this example, because the oil 206 and the water 208 may have different weights, and assuming that the flow metering device 200 is positioned to be horizontal or near horizontal, the oil 206 and the water 208 may be essentially separated. Accordingly, the oil 206 may interact with the fluidic oscillators positioned in the upper half of the flow metering device 200—e.g., the fluidic oscillators 222-224. The water 208 may interact with the fluidic oscillators positioned in the lower half of the flow metering device 200—e.g., the fluidic oscillators 226-228.

The variations in the flow rate may result in each fluidic oscillator 222-228 generating a corresponding acoustic signal, as described above. Each of the fluidic oscillator 222-228 may be tuned to generate a specific frequency. An optical fiber 202 may be coupled to, near, or inside the pipe 204 to detect the acoustic signals. For example, with reference to FIG. 1, optical fiber 202 may be coupled to the outside of a casing 102 and cemented in place with the casing 102. Various phase ratios (e.g., the fluid comprises 50% oil and 50% water) and flow rates may produce unique acoustic signals from each of the fluidic oscillators 222-228. Each of the acoustic signals from the fluidic oscillators 222-228 that may be detected by the optical fiber 202 may be combined into a single time series dataset, resulting in the DAS differential phase time domain signal. While described in reference to using an optical fiber to detect the acoustic signals, other types of acoustic detection devices may be used. For example, hydrophones, geophones, sensors, etc. may be used to detect the acoustic signals.

Example Operations

Figure 3:
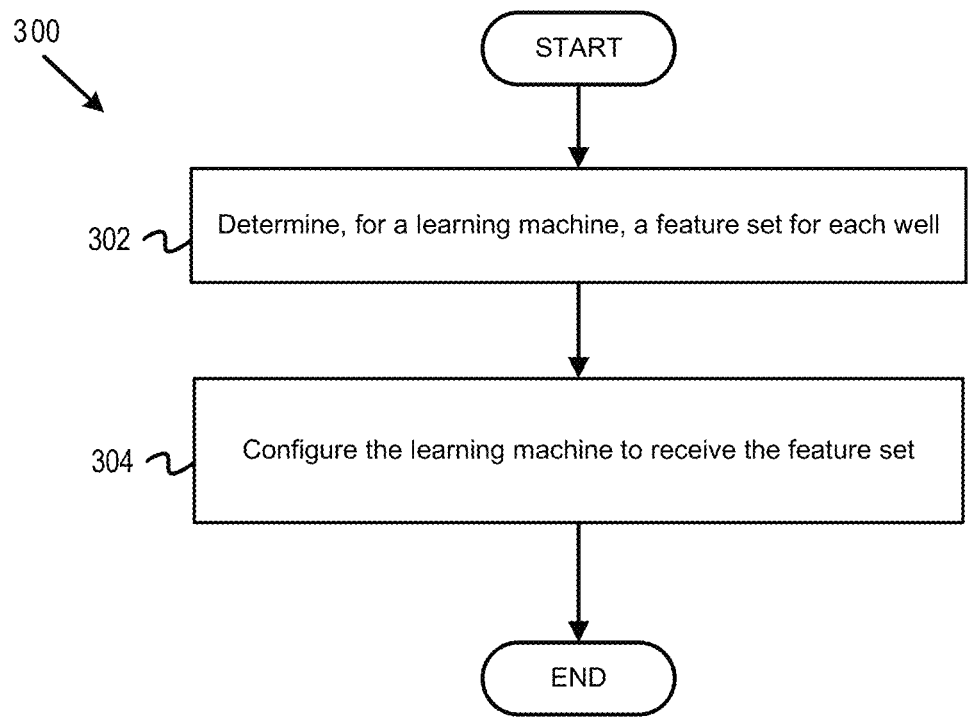
FIG. 3 depicts a flowchart of example operations for configuring a learning machine with a feature set, according to some implementations.

FIG. 3 depicts a flowchart of example operations for configuring a learning machine with a feature set, according to some implementations. FIG. 3 includes a flowchart 300 for configuring a learning machine with a feature set. Operations of flowchart 300 of FIG. 3 are described in reference to the learning machine 103 of FIG. 1. Operations of the flowchart 300 start at block 302.

At block 302, the learning machine 103 may determine a feature set for a well. The feature set may include DAS data for the well, one or more fluid properties, one or more flow properties, and one or more fluidic oscillator properties. The DAS data may include information derived from an acoustic signal, such as power spectral densities generated by one or more fluid oscillators located on or near the wellhead of the wellbore. The fluid property may include information about viscosity of fluids in the well. The flow property may include information about flow rates of the fluid from the well. The fluidic oscillator property may include information indicating an orientation angle for each fluidic oscillator in or around the well. The power DAS data, fluid property, flow property, and fluidic oscillator property will be discussed in greater detail below. Some implementations may utilize any suitable feature set including any suitable value related to the well and reservoir models related to the well. In some embodiments, the feature set may include other optical data such as DSS data, DVS data, DTS data, etc. For example, DSS data may include information derived from interferometric sensors (e.g., sensors 103A-C). At block 304, the learning machine 103 may be configured to receive the feature set as input. For example, the learning machine may include a neural network, such as a convolutional neural network, that includes an input layer, one or more hidden layers, and an output layer. Each layer may include one or more neurons. In some implementations, one or more neurons of the input layer are configured to receive the features as input. As noted, the features may include DAS data, a fluid property, a flow property, and a fluidic oscillator property. In some implementations, the learning machine 103 need not utilize a neural network. The learning machine 103 may utilize any suitable modeling technique configured to operate on the above-noted feature set. The flowchart 300 ends after block 304.

After block 304, the learning machine begin training itself based on training samples. The discussion of FIG. 4 provides additional details about training samples and training the learning machine.

Figure 4:
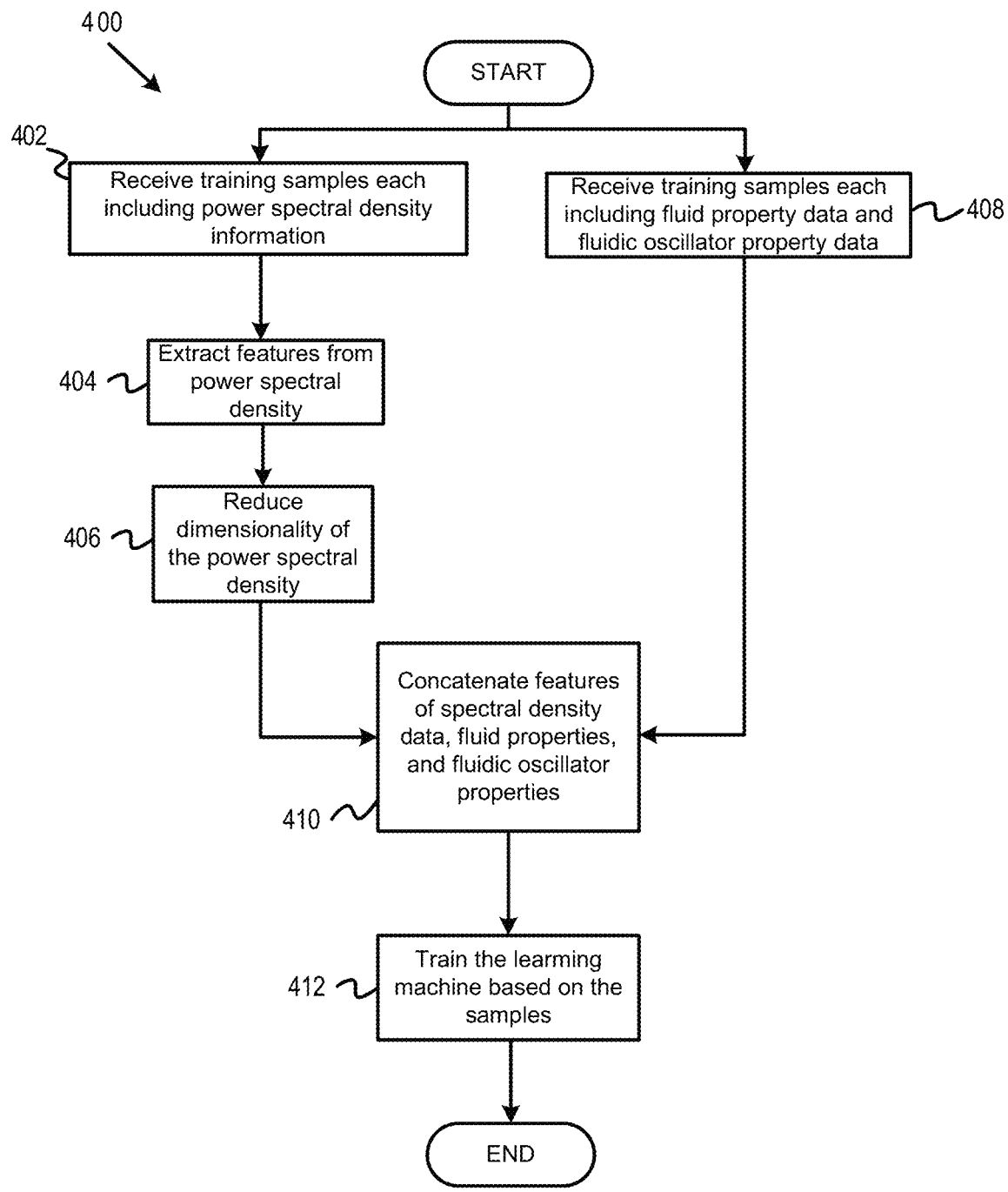
FIG. 4 depicts a flowchart of example operations of a trained phase flow rate machine learning model, according to some embodiments.

FIG. 4 depicts a flowchart of example operations for training a learning machine to predict phase flow rates of fluid from a wellbore, according to some embodiments. In some implementations, operations of the flowchart 400 may be performed by a neural network, such as a 1-dimensional convolutional neural network. The left and right branches of the flowchart 400 may represent feed-forward branches of the neural network. In some embodiments, the learning machine 103 may include any suitable machine-learning model that performs the operations in the flowchart 400. Operations of the flowchart 400 are described in reference to the learning machine 103 of FIG. 1. Operations of the flowchart 400 start at block 402.

At block 402, the learning machine 103 may receive a first group of training samples. Each training sample in the first group may include information derived from a sample acoustic signal, such as power spectral density information derived from the sample acoustic signal. The power spectral density information may have a corresponding flow rate. For instance, the power spectral density information may correspond to a particular set of oil, water, and gas flow rates. In some implementations, each of the training samples may be generated via synthetic modeling. For example, a flow metering device, such as flow metering device 200 of FIG. 2, may be placed at a position in a wellbore model at various angles. Fluids comprising various phase ratios and flow rates may be run through the wellbore model to generate a sample acoustic signal from the flow metering device. The flow metering device may then be placed at other positions in the wellbore model and at varying angles at each position to capture various flow rate and phase ratio scenarios. As stated above, power spectral density may be derived from each of the sample acoustic signals to generate a group of training samples comprising sample power spectral density and associated flow rates and phase ratios. The power spectral density information may be generated by operations described below in blocks 502-512 of FIG. 5. In some embodiments, the training samples may include other optical data such as DSS data, DVS data, DTS data, etc. For example, the power spectral density information may relate to strain, vibration, or temperature data captured by the well system 100.

At block 404, the learning machine 103 may extract features from the information derived from the sample acoustic signal. For example, the learning machine 103 may extract features from power spectral density information derived from the sample acoustic signal. For example, the learning machine 103 may include filters that extract features from the power spectral density information. Features extracted from the power spectral density information may include power spectral density and wavelet transform. Other features extracted may include time-domain attributes such as root-mean-square (RMS) amplitudes and zero crossing rates.

At block 406, the learning machine 103 may reduce dimensionality of the power spectral density information. In some embodiments the power spectral density may be put through multiple (i.e., 2, 30, 100, etc.) convolutional layers/pooling operations to reduce the data dimensionality and develop the most relevant statistical elements of the power spectral density.

At block 408, the learning machine 103 may receive a second group of training samples, where each training sample of the second group includes a sample fluid property and a sample fluidic oscillator property. The sample fluid property may indicate in situ formation dynamic viscosity of the fluid in the wellbore. The sample fluidic oscillator property may indicate an orientation angle of the fluidic oscillator(s) in the wellbore (e.g., orientation angle of the fluidic oscillators relative to the direction of flow). In some embodiments, no feature maps are developed for this branch of the operation.

At block 410, the learning machine 103 may concatenate features of the reduced dimensionality of the power spectral density information, the fluid property, and the fluidic oscillator property.

At block 412, the learning machine 103 may train itself to predict phase flow rates based on the training samples received at blocks 402 and 408. For example, the learning machine 103 may receive training samples including sample power spectral density information derived from an acoustic signal (block 402), a sample fluid property (block 408), and a sample fluidic oscillator property (block 408). Based on the training samples, the learning machine may perform training to predict phase flow rates of fluid from a wellbore. As noted, the learning machine 103 may include a neural network. In some implementations, the learning machine may process the training samples and perform back propagation to minimize a cost function for the neural network. The learning machine 103 may use fewer than all the training samples in its training process. For example, the learning machine 103 may utilize 80% of the training samples at block 306. Later, the learning machine may use the remaining 20% of the training samples to test the learning machine. In some implementations, inaccuracies may be included in the training samples to train robustness into the learning machine. For instance, if a sensor were to fail or be faulty, the learning machine would be trained to output phase-flow ratios without the missing or faulty sensor data.

Figure 5:
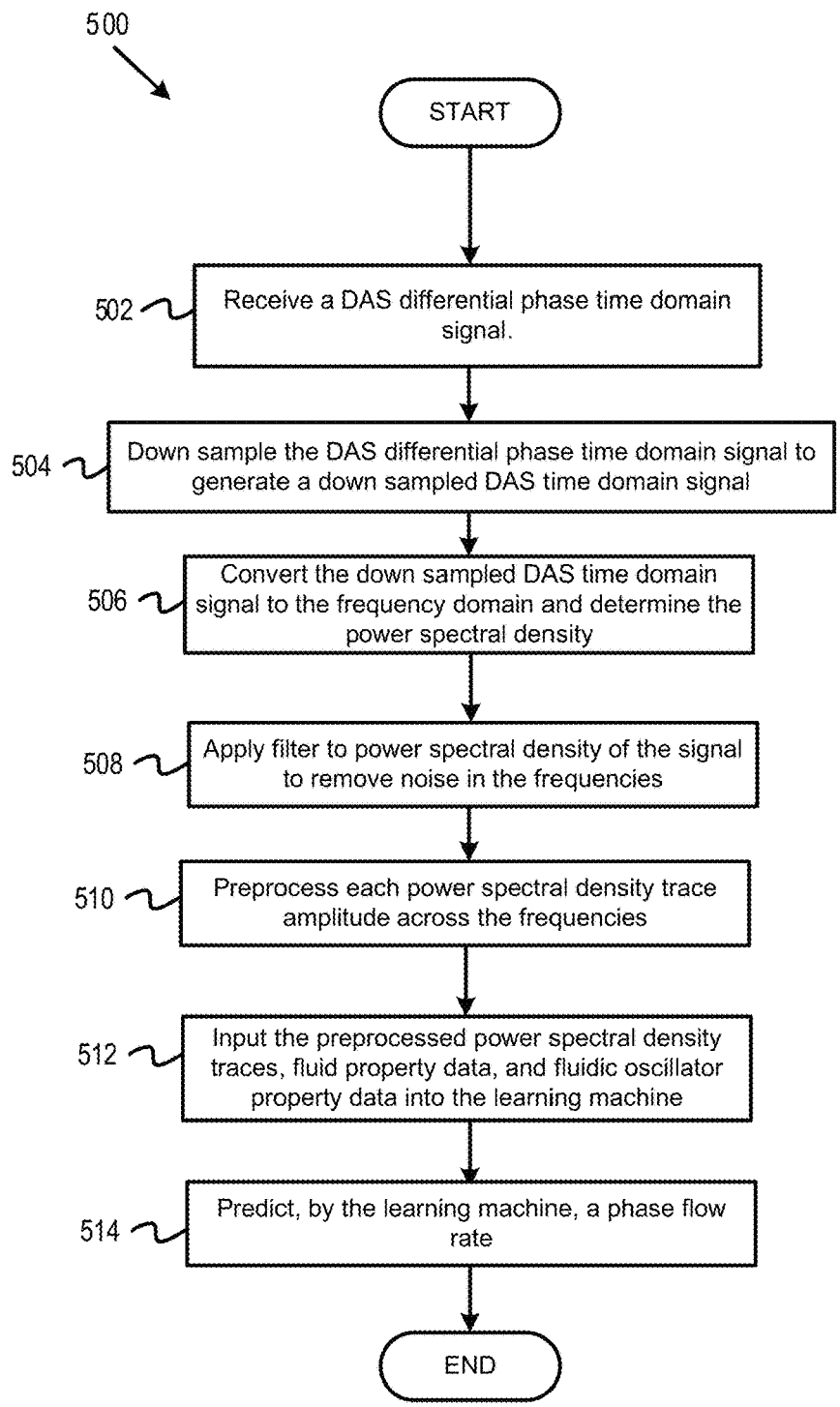
FIG. 5 depicts a flowchart of example operations to predict phase flow rates of fluid from a wellbore, according to some embodiments.

FIG. 5 depicts a flowchart of example operations for processing DAS signal data for use with a learning machine, according to some embodiments. In FIG. 5, flow begins at block 502.

At block 502, fiber optic interrogation unit 112 may measure a differential phase time domain signal. In some embodiments, the flow metering device may include at least one fluidic oscillator that may cause oscillation (i.e., a variation) in the flow rate of the fluid, imparting a pressure wave in the fluid. The pressure wave (i.e., change in pressure) may have a corresponding reaction force that may create an acoustic signal (or equivalent thereof) that is measured by a vibration/seismic sensor such as an optical fiber of the fiber optic interrogation unit 112.

At block 504, the signal processor 107 may down-sample the measured DAS differential phase time domain signal to generate a down-sampled DAS time domain signal. In some embodiments the DAS differential phase time domain signal is down-sampled to a Nyquist frequency. For example, the DAS differential phase time domain signal may be down-sampled to a Nyquist frequency of 50 Hz, 125 Hz, 200 Hz, etc. Additionally, an anti-alias filter may be applied when the signal is down-sampled to a Nyquist frequency.

At block 506, the signal processor may convert the down-sampled DAS time domain signal into the frequency domain and determine power spectral density information of the DAS signal. In some embodiments, a time window and step length of the down-sampled DAS time domain signal may be specified. A Fourier transform may then be applied to the specified time window to convert the down-sampled DAS time domain signal to the frequency domain for that time window. Additionally, the power spectral density of the DAS data of the frequency domain may be determined over the specified time window. This process may be repeated across time, according to the specified step length, for the remaining down-sampled DAS time domain signal to generate the power spectral density for the down-sampled DAS time domain signal.

Figure 6:
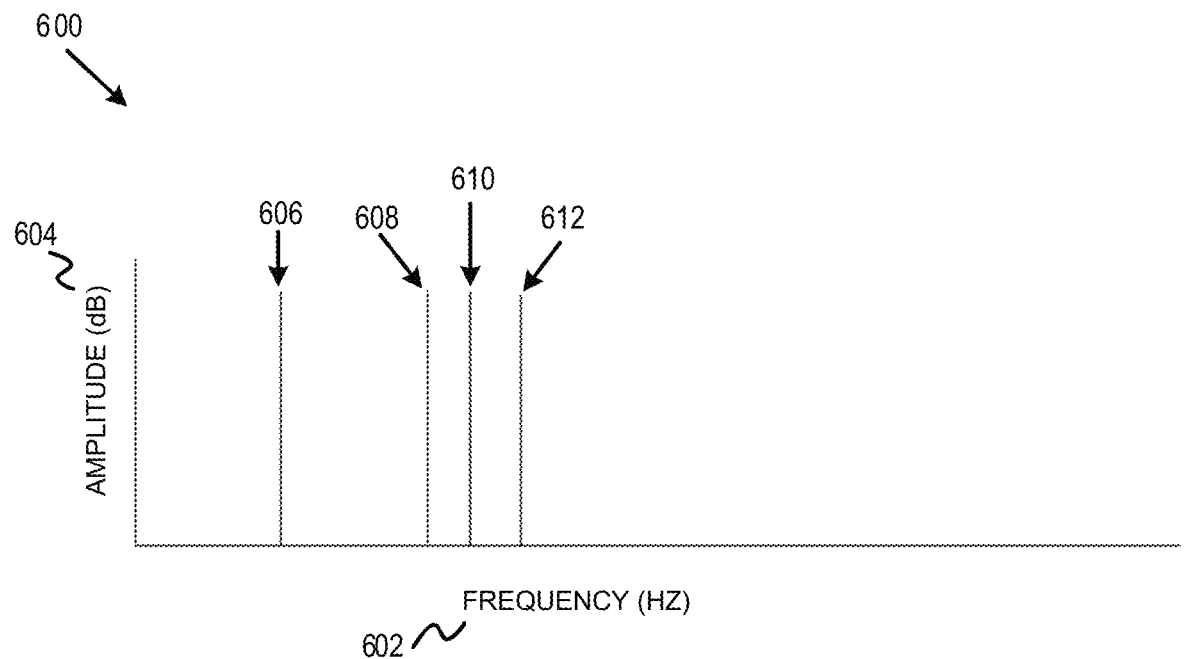
FIG. 6 depicts an example graph of the power spectral density, according to some embodiments.

For example, FIG. 6 depicts an example graph of the power spectral density information, according to some embodiments. The graph 600 includes an x-axis 602 and a y-axis 604. The x-axis 602 is the frequency having units in hertz (Hz). The y-axis 604 is the amplitude having units in decibels (dB). A fluidic oscillator may be tuned to generate specific frequency peaks as fluid passes through the fluidic oscillator. The graph 600 depicts peaks 606-612, where each of the peaks 606-612 may be associated with a fluidic oscillator. The graph 600 represents the power spectral density of a specified time window, and may be regenerated for each specified time window of the DAS time domain signal as it steps across time according to the specified step length. The difference between peaks 606-612 relative to frequency may be based on properties of the fluid (e.g., fluid density) and, in some embodiments, may be used to determine the fluid types passing through the fluidic oscillators. For instance, a trained machine learning model may use the peaks 606-612 to assist in predicting fluid phase flow rates.

At block 508, the signal processor 107 may apply a filter to the power spectral density information to remove noise in the frequencies. Two-dimensional filtering may be applied once a predetermined number of power spectral density traces are computed. Various signal processing routines such as median filtering, SVD filtering, and notch filtering may be performed to remove noise that is not associated with the signal.

At block 510, the signal processor 107 may preprocess each power spectral density trace amplitude across the frequencies. In some embodiments, the power spectral density trace amplitudes may be preprocessed to scale the amplitudes to be within a specified range. For example, a range with maximum value of 1 and a minimum value of 0 may be specified such that the trace amplitudes are scaled to have a value between 0 and 1.

At block 512, the learning machine 103 may receive the preprocessed power spectral energy trances as input. Additionally, the learning machine 103 may also receive, as input, at least one measured fluid property (e.g., data indicating a measurement of viscosity of fluids in the well) and at least one fluidic oscillator property (e.g., data indicating a measured or otherwise known orientation angle of each fluidic oscillator). The learning machine 103 may predict a phase flow rate based on the input (see block 514).

At block 514, the learning machine 103 may predict a phase flow rate based on the preprocessed power spectral energy trances, the measured fluid property, and the measured fluidic oscillator property. The predicted phase flow rate may include a predicted flow rate of each phase in the fluid flowing through the flow metering device. For instance, the learning machine may indicate the total flow rate of the fluid flowing through the flow metering device and the ratio of each phase in the fluid. Thus, the learning machine 103 may provide a predicted rate of oil, a predicted rate of water, and a predicted rate of gas that is flowing through the flow metering device.

In some embodiments, the flowchart 500 may be adapted to operate on other optical data such as DSS data, DVS data, DTS data, etc.

In FIG. 5, the learning machine 103 may utilize power spectral frequency density traces. However, the learning machine may utilize different aspects of DAS data. For example, the learning machine 103 may utilize power spectral frequency peaks. Such embodiments are described with respect to FIG. 7.

Figure 7:
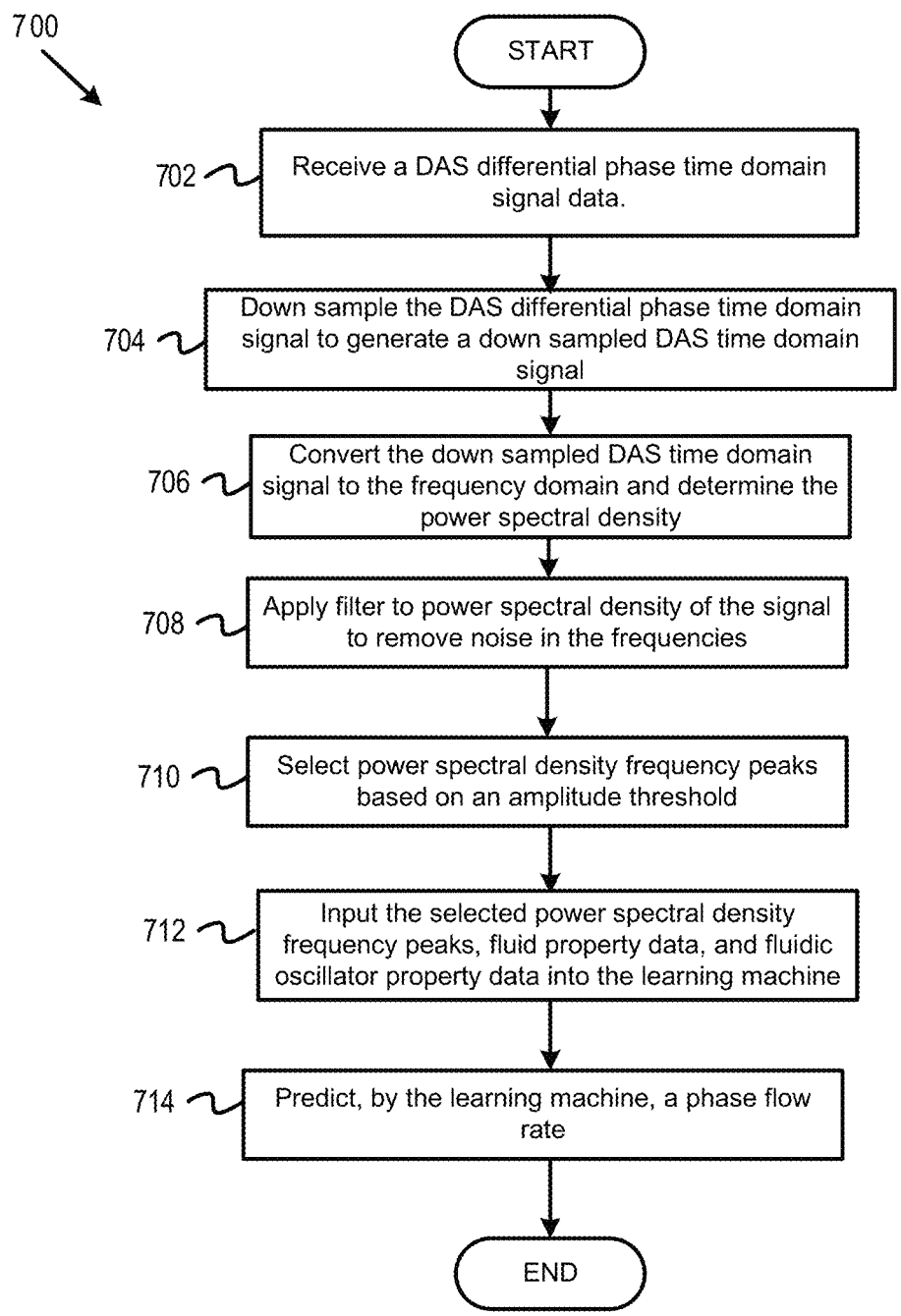
FIG. 7 depicts a flowchart of example operations for training a learning machine to predict phase flow rates of fluid from a wellbore based on spectral density frequency peaks, according to some embodiments.

FIG. 7 depicts a flowchart of example operations for training a learning machine to predict phase flow rates of fluid from a wellbore based on spectral density frequency peaks, according to some embodiments. FIG. 7 includes a flowchart 700 of alternate techniques to predict phase flow rates. Operations of flowchart 700 of FIG. 7 are described in reference to the processor of computer 110 of FIG. 1. Operations of the flowchart 700 start at block 702.

Blocks 702-708 are similar to the operations of blocks 502-508 of FIG. 5.

At block 710, the learning machine 103 may select power spectral density frequency peaks based on an amplitude threshold. The frequency peaks, such as frequency peaks 606-612 of FIG. 6, may be selected based on a threshold. For instance, an amplitude threshold may be set such that frequency peaks greater than or equal to the amplitude threshold may be selected.

At block 714, the learning machine 103 may predict a phase flow rate based on the power spectral energy peaks, the measured fluid property, and the measured fluidic oscillator property. The predicted phase flow rate may include a predicted flow rate of each phase in the fluid flowing through the flow metering device. For instance, the learning machine may indicate the total flow rate of the fluid flowing through the flow metering device and the ratio of each phase in the fluid. Thus, the learning machine 103 may provide a predicted rate of oil, a predicted rate of water, and a predicted rate of gas that is flowing through the flow metering device.

In some embodiments, the flowchart 700 may be adapted to operate on other optical data such as DSS data, DVS data, DTS data, etc.

Figure 8:
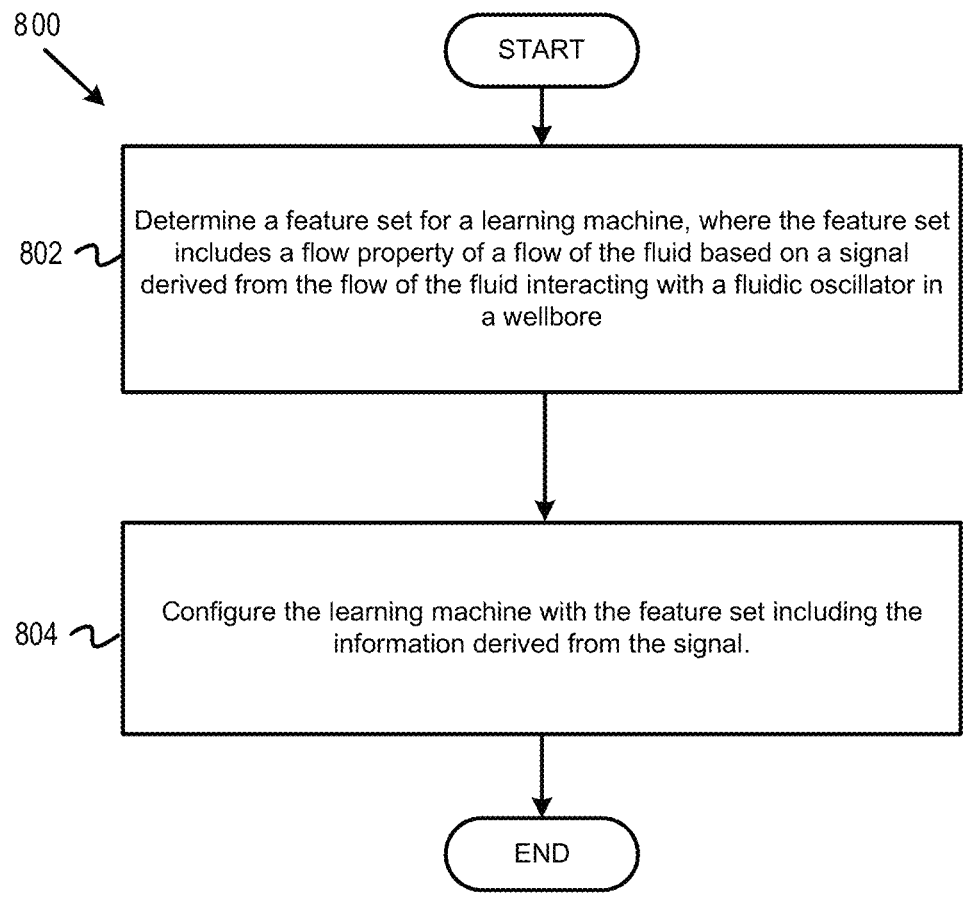
FIG. 8 describes operations of an embodiment.

FIG. 8 depicts a flowchart of example operations of predicting a flow rate of at least one phase of fluid, according to an embodiment. FIG. 8 relates to a machine learning model configured to predict phase flow rates. Operations of the flowchart 800 start at block 802.

Block 802 determines a feature set for a learning machine, where the feature set includes a flow property of a flow of the fluid based on an signal derived from the flow of the fluid interacting with a fluidic oscillator in a wellbore.

Block 804 configures the learning machine with the feature set including the information derived from the signal.

In some embodiments, the feature set may include data derived from surface and/or subsurface signals including pressure, temperature, vibration, etc. detected by various sensors (e.g., electrical sensors). Therefore, any of the operations described herein may not be limited to acoustic signals. For example, some implementations may not use acoustic signals but instead any other suitable signals such as signals relating to pressure, temperature, vibration, etc. Some embodiments may utilize a combination of acoustic signals and other suitable signals.

Example Computer

FIG. 9 depicts an example computer, according to some embodiments. FIG. 9 depicts a computer 900 that includes a processor 901 (possibly including multiple processors, multiple cores, multiple nodes, and/or implementing multi-threading, etc.). The computer 900 includes a memory 907. The memory 907 may be system memory or any one or more of the above already described possible realizations of machine-readable media. The computer 900 also includes a bus 903 and a network interface 905.

The computer 900 also includes a signal processor 911 and a learning machine 915. The signal processor 911 and the learning machine 915 may perform one or more of the operations described herein. For example, the signal processor 911 may process DAS data, such as DAS signals and create data suitable for input into the learning machine 915. The learning machine 915 may receive information created by the signal processor (e.g., DAS spectral energy traces). The learning machine 915 may receive information from other components, such as fluid property data and fluidic oscillator property data. Based the DAS spectral energy trances and other information, the learning machine may predict the phase flow rates of a fluid in a wellbore. In response to the predicted phase flow rates of the fluid in the wellbore, a controller 917 may perform various operations to a wellbore. For example, the controller 917 may perform an operation downhole based on the predicted phase flow rates of the fluid in the wellbore.

Any one of the previously described functionalities may be partially (or entirely) implemented in hardware and/or on the processor 901. For example, the learning machine 915 may include machine-readable instructions, some of which may reside in the memory 907 and may be executed on the processor 901. The functionality described may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory 907 may be coupled to the processor 901.

While the aspects of the disclosure are described with reference to various implementations and exploitations, it will be understood that these aspects are illustrative and that the scope of the claims is not limited to them. In general, techniques for simulating drill bit abrasive wear and damage during the drilling of a wellbore as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

This description includes example systems, methods, techniques, and program flows that embody embodiments of the disclosure. However, this disclosure may be practiced without these specific details. For instance, this disclosure refers to predicting the phase flow rates based on the power spectral density of acoustic signals in the frequency domain. Embodiments of this disclosure may also be used to predict the phase flow rates based on other transformations of the acoustic signals. In other instances, well-known instruction instances, protocols, structures, and techniques have not been shown in detail in order not to obfuscate the description.

Example Embodiments

Embodiment #1: A method for configuring a learning machine to predict a flow rate of at least one phase of a fluid, comprising: determining a feature set for the learning machine, the feature set including information derived from a signal generated by a flow of the fluid interacting with a fluidic oscillator in a wellbore; and configuring the learning machine with the feature set including information derived from the signal.

Embodiment #2: The method of Embodiment #1, wherein the feature set further includes a fluid property of the fluid, and a fluidic oscillator property associated with the interaction of the fluid with the fluidic oscillator.

Embodiment #3: The method of Embodiments #1 or #2 further comprising: training the learning machine to predict the flow rate of at least one phase of the fluid based on a plurality of training samples, wherein each of the training samples includes a sample ratio of phases of the fluid and an associated flow rate sample for each ratio, and wherein each of the training samples also includes a fluid property sample, a fluidic oscillator property sample, and information derived from a sample of the signal, wherein in each of the training samples, the sample ratio of phases of the fluid and the associated sample flow rate sample for each ratio are associated with the fluid property sample, the fluidic oscillator property sample, and the information derived from a sample of the signal.

Embodiment #4: The method of Embodiment #3 further comprising: inputting, into the learning machine, a measurement sample including a measured fluid property, a measured fluidic oscillator property, and information derived from a measurement of the signal; and predicting, via the learning machine, the flow rate of at least one phase of the fluid based on the measurement sample.

Embodiment #5: The method of Embodiment #4, further comprising: performing a downhole operation in the wellbore based on the predicted flow rate of the at least one phase of the fluid.

Embodiment #6: The method of Embodiment #3, wherein the information derived from the sample of the signal includes a power spectral density of the signal, wherein the learning machine comprises a neural network, and wherein training the learning machine further comprises: passing the fluidic oscillator property sample and the fluid property sample through a first feed forward branch of the neural network; processing the power spectral density through a second feed forward branch of the neural network to create a reduced dimensionality of the power spectral density; concatenating the fluidic oscillator property sample and the fluid property sample with the reduced dimensionality of the power spectral density to form the feature set; and outputting, by the neural network, a prediction of the flow rate of at least one phase of the fluid based, at least in part, on the concatenated feature set.

Embodiment #7: The method of any one or more of Embodiment #1-6, further comprising: determining a time domain signal based on the signal; converting the time domain signal into a frequency domain signal; and determining a power spectral density of the signal based on the frequency domain signal, wherein the information derived from the signal includes the power spectral density of the signal.

Embodiment #8: The method of Embodiment #7, wherein the power spectral density includes a plurality of power spectral density traces, wherein each power spectral density trace is associated with an amplitude and a frequency, further comprising: scaling the respective amplitude of each power spectral density trace to be within a range of amplitude values.

Embodiment #9: The method of Embodiment #7, wherein the power spectral density includes a plurality of power spectral density traces, wherein each power spectral density trace is associated with an amplitude and a frequency, further comprising: selecting those power spectral density traces having a respective associated amplitude greater than a threshold.

Embodiment #10: The method of Embodiment #2 further comprising: detecting a viscosity of the fluid in the wellbore, wherein the fluid property includes the viscosity; and determining an orientation angle of the fluidic oscillator relative to the flow of the fluid, wherein the fluidic oscillator property includes the orientation angle.

Embodiment #11: The method of Embodiment #10, wherein the fluidic oscillator is positioned in a location in the wellbore that is approximately horizontal.

Embodiment #12: A non-transitory computer-readable medium including computer-executable instructions comprising: instructions to determine a feature set for a learning machine, the feature set including information derived from a signal generated by a flow of a fluid interacting with a fluidic oscillator in a wellbore; and instructions to configure the learning machine with the feature set including information derived from the signal.

Embodiment #13: The non-transitory computer-readable medium of Embodiment #12, wherein the feature set further includes a fluid property of the fluid, and a fluidic oscillator property associated with the interaction of the fluid with the fluidic oscillator.

Embodiment #14: The non-transitory computer-readable medium of Embodiment #13 further comprising: instructions to train the learning machine to predict a flow rate of at least one phase of the fluid based on a plurality of training samples, wherein each of the training samples includes a sample ratio of phases of the fluid and an associated sample flow rate for each ratio, and wherein each of the training samples also includes a fluid property sample, a fluidic oscillator property sample, and information derived from a sample of the signal, wherein in each of the training samples, the sample ratio of phases of the fluid and the associated sample flow rate sample for each ratio are associated with the fluid property sample, the fluidic oscillator property sample, and the information derived from a sample of the signal.

Embodiment #15: The non-transitory computer-readable medium of any one or more of Embodiments #12-14 further comprising: instructions to input, into the learning machine, a measurement sample including a measured fluid property sample, a measured fluidic oscillator property, and information derived from a measurement of the signal; and instructions to predict, via the learning machine, a flow rate of at least one phase of the fluid based on the measurement sample.

Embodiment #16: The non-transitory computer-readable medium of Embodiment #14, wherein the information derived from the sample of the signal includes a power spectral density of the signal, wherein the learning machine comprises a neural network, and wherein training the learning machine further comprises: instructions to pass the fluidic oscillator property sample and the fluid property sample through a first feed forward branch of the neural network; instructions to process the power spectral density through a second feed forward branch of the neural network to create a reduced dimensionality of the power spectral density; instructions to concatenate the fluidic oscillator property sample and the fluid property sample with the reduced dimensionality of the power spectral density to create the feature set; and instructions to output, by the neural network, a prediction of the flow rate of at least one phase of the fluid based, at least in part, on the concatenated feature set.

Embodiment #17: A system comprising: a processor; and a computer-readable medium having instructions stored thereon that are executable by the processor, the instructions including instructions to determine a feature set for a learning machine, the feature set including information derived from a signal generated by a flow of a fluid interacting with a fluidic oscillator in a wellbore; and instructions to configure the learning machine with the feature set including information derived from the signal.

Embodiment #18: The system of Embodiment #17 further comprising: instructions to train the learning machine to predict a flow rate of at least one phase of the fluid based on a plurality of training samples, wherein each of the training samples includes a sample ratio of phases of the fluid and an associated flow rate sample for each ratio, and wherein each of the training samples also includes information derived from a sample of the signal, wherein in each of the training samples, the sample ratio of phases of the fluid and the associated flow rate for each ratio are associated with the information derived from a sample of the signal.

Embodiment #19: The system of Embodiment #18 further comprising: instructions to input, into the learning machine, a measurement sample including information derived from a measurement of the signal; and instructions to predict, via the learning machine, the flow rate of at least one phase of the fluid based on the measurement sample.

Embodiment #20. The system of Embodiment #18, wherein the information derived from the sample of the signal includes a power spectral density of the signal, wherein the learning machine comprises a neural network, and wherein training the learning machine further comprises: instructions to pass a fluidic oscillator property sample and a fluid property sample through a first feed forward branch of the neural network; instructions to process the power spectral density through a second feed forward branch of the neural network to create a reduced dimensionality of the power spectral density; instructions to concatenate the fluidic oscillator property sample and the fluid property sample with the reduced dimensionality of the power spectral density to form the feature set; and instructions to output, by the neural network, a prediction of the flow rate of at least one phase of the fluid based, at least in part, on the feature set.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

What is claimed is:

1. A method for configuring a learning machine to predict a flow rate of at least one phase of a fluid, comprising:
   determining a feature set for the learning machine, the feature set including information derived from a signal generated by a flow of the fluid interacting with a fluidic oscillator in a wellbore; and
   configuring the learning machine with the feature set including information derived from the signal.

2. The method of claim 1, wherein the feature set further includes a fluid property of the fluid, and a fluidic oscillator property associated with the interaction of the fluid with the fluidic oscillator.

3. The method of claim 2 further comprising:
   training the learning machine to predict the flow rate of at least one phase of the fluid based on a plurality of training samples,
      wherein each of the training samples includes a sample ratio of phases of the fluid and an associated flow rate sample for each ratio, and wherein each of the training samples also includes a fluid property sample, a fluidic oscillator property sample, and information derived from a sample of the signal,
      wherein in each of the training samples, the sample ratio of phases of the fluid and the associated sample flow rate sample for each ratio are associated with the fluid property sample, the fluidic oscillator property sample, and the information derived from a sample of the signal.

4. The method of claim 3 further comprising:
   inputting, into the learning machine, a measurement sample including a measured fluid property, a measured fluidic oscillator property, and information derived from a measurement of the signal; and predicting, via the learning machine, the flow rate of at least one phase of the fluid based on the measurement sample.

5. The method of claim 4, further comprising:
performing a downhole operation in the wellbore based on the predicted flow rate of the at least one phase of the fluid.

6. The method of claim 3, wherein the information derived from the sample of the signal includes a power spectral density of the signal, wherein the learning machine comprises a neural network, and wherein training the learning machine further comprises:
passing the fluidic oscillator property sample and the fluid property sample through a first feed forward branch of the neural network;
processing the power spectral density through a second feed forward branch of the neural network to create a reduced dimensionality of the power spectral density;
concatenating the fluidic oscillator property sample and the fluid property sample with the reduced dimensionality of the power spectral density to form the feature set; and
outputting, by the neural network, a prediction of the flow rate of at least one phase of the fluid based, at least in part, on the concatenated feature set.

7. The method of claim 1, further comprising:
determining a time domain signal based on the signal;
converting the time domain signal into a frequency domain signal; and
determining a power spectral density of the signal based on the frequency domain signal, wherein the information derived from the signal includes the power spectral density of the signal.

8. The method of claim 7, wherein the power spectral density includes a plurality of power spectral density traces, wherein each power spectral density trace is associated with an amplitude and a frequency, further comprising:
scaling the respective amplitude of each power spectral density trace to be within a range of amplitude values.

9. The method of claim 7, wherein the power spectral density includes a plurality of power spectral density traces, wherein each power spectral density trace is associated with an amplitude and a frequency, further comprising:
selecting those power spectral density traces having a respective associated amplitude greater than a threshold.

10. The method of claim 2 further comprising:
detecting a viscosity of the fluid in the wellbore, wherein the fluid property includes the viscosity; and
determining an orientation angle of the fluidic oscillator relative to the flow of the fluid, wherein the fluidic oscillator property includes the orientation angle.

11. The method of claim 10, wherein the fluidic oscillator is positioned in a location in the wellbore that is approximately horizontal.

12. A non-transitory computer-readable medium including computer-executable instructions comprising:
instructions to determine a feature set for a learning machine, the feature set including information derived from a signal generated by a flow of a fluid interacting with a fluidic oscillator in a wellbore; and
instructions to configure the learning machine with the feature set including information derived from the signal.

13. The non-transitory computer-readable medium of claim 12, wherein the feature set further includes a fluid property of the fluid, and a fluidic oscillator property associated with the interaction of the fluid with the fluidic oscillator.

14. The non-transitory computer-readable medium of claim 13 further comprising:
instructions to train the learning machine to predict a flow rate of at least one phase of the fluid based on a plurality of training samples,
wherein each of the training samples includes a sample ratio of phases of the fluid and an associated sample flow rate for each ratio, and wherein each of the training samples also includes a fluid property sample, a fluidic oscillator property sample, and information derived from a sample of the signal,
wherein in each of the training samples, the sample ratio of phases of the fluid and the associated sample flow rate sample for each ratio are associated with the fluid property sample, the fluidic oscillator property sample, and the information derived from a sample of the signal.

15. The non-transitory computer-readable medium of claim 12 further comprising:
instructions to input, into the learning machine, a measurement sample including a measured fluid property sample, a measured fluidic oscillator property, and information derived from a measurement of the signal; and
instructions to predict, via the learning machine, a flow rate of at least one phase of the fluid based on the measurement sample.

16. The non-transitory computer-readable medium of claim 14, wherein the information derived from the sample of the signal includes a power spectral density of the signal, wherein the learning machine comprises a neural network, and wherein training the learning machine further comprises:
instructions to pass the fluidic oscillator property sample and the fluid property sample through a first feed forward branch of the neural network;
instructions to process the power spectral density through a second feed forward branch of the neural network to create a reduced dimensionality of the power spectral density;
instructions to concatenate the fluidic oscillator property sample and the fluid property sample with the reduced dimensionality of the power spectral density to create the feature set; and
instructions to output, by the neural network, a prediction of the flow rate of at least one phase of the fluid based, at least in part, on the concatenated feature set.

17. A system comprising:
a processor; and
a computer-readable medium having instructions stored thereon that are executable by the processor, the instructions including
instructions to determine a feature set for a learning machine, the feature set including information derived from a signal generated by a flow of a fluid interacting with a fluidic oscillator in a wellbore; and
instructions to configure the learning machine with the feature set including information derived from the signal.

18. The system of claim 17 further comprising:
instructions to train the learning machine to predict a flow rate of at least one phase of the fluid based on a plurality of training samples, wherein each of the training samples includes a sample ratio of phases of the fluid and an associated flow rate sample for each ratio, and wherein each of the training samples also includes information derived from a sample of the signal, wherein in each of the training samples, the sample ratio of phases of the fluid and the associated flow rate for each ratio are associated with the information derived from a sample of the signal.

19. The system of claim 18 further comprising:

instructions to input, into the learning machine, a measurement sample including information derived from a measurement of the signal; and instructions to predict, via the learning machine, the flow rate of at least one phase of the fluid based on the measurement sample.

20. The system of claim 18, wherein the information derived from the sample of the signal includes a power spectral density of the signal, wherein the learning machine comprises a neural network, and wherein training the learning machine further comprises:

instructions to pass a fluidic oscillator property sample and a fluid property sample through a first feed forward branch of the neural network;

instructions to process the power spectral density through a second feed forward branch of the neural network to create a reduced dimensionality of the power spectral density;

instructions to concatenate the fluidic oscillator property sample and the fluid property sample with the reduced dimensionality of the power spectral density to form the feature set; and instructions to output, by the neural network, a prediction of the flow rate of at least one phase of the fluid based, at least in part, on the feature set.

* * * * *